(12) United States Patent
Dawson et al.

(10) Patent No.: US 11,913,571 B2
(45) Date of Patent: Feb. 27, 2024

(54) MARKED GUIDE FOR CONDUIT OR TUBE BENDING

(71) Applicant: Fastbender LLC, Long Beach, CA (US)

(72) Inventors: Ramon C. Dawson, Long Beach, CA (US); Michael Kevin Bubolz, Milwaukee, WI (US)

(73) Assignee: Fastbender LLC, Long Beach, CA (US)

( * ) Notice: Subject to any disclaimer, the term of this patent is extended or adjusted under 35 U.S.C. 154(b) by 233 days.

(21) Appl. No.: 17/188,736

(22) Filed: Mar. 1, 2021

(65) Prior Publication Data

US 2022/0275887 A1   Sep. 1, 2022

(51) Int. Cl.
  *F16L 11/12*  (2006.01)
  *B29C 67/24*  (2006.01)
  *B29L 23/00*  (2006.01)

(52) U.S. Cl.
  CPC .......... *F16L 11/124* (2013.01); *B29C 67/246* (2013.01); *B29L 2023/005* (2013.01)

(58) Field of Classification Search
  CPC . F16L 9/00; F16L 9/006; F16L 11/124; B29C 53/08; B29L 2023/22
  USPC ..................... 138/DIG. 8, 104, 36
  See application file for complete search history.

(56) References Cited

U.S. PATENT DOCUMENTS

| | | | |
|---|---|---|---|
| 928,606 A | 7/1909 | Houghton | |
| 3,847,184 A * | 11/1974 | God | F16L 11/15 4/DIG. 16 |
| 4,100,827 A * | 7/1978 | Flemming | B23B 13/08 193/38 |
| 4,205,034 A * | 5/1980 | Newberry | B29C 53/82 264/171.18 |
| 4,312,383 A | 1/1982 | Kleykamp | |
| 4,399,319 A * | 8/1983 | Zinn | F24S 80/30 174/95 |
| 5,027,741 A | 7/1991 | Smith et al. | |
| 5,036,210 A | 7/1991 | Goodman | |
| 5,051,034 A | 9/1991 | Goodman | |
| 5,122,750 A | 6/1992 | Rippingale et al. | |

(Continued)

FOREIGN PATENT DOCUMENTS

EP   1 079 162 A1   2/2001

OTHER PUBLICATIONS

Final Office Action dated Dec. 4, 2018, from U.S. Appl. No. 15/648,356.

(Continued)

*Primary Examiner* — Patrick F Brinson
(74) *Attorney, Agent, or Firm* — Foley & Lardner LLP

(57) ABSTRACT

A marked guide includes an elongated body having a bendable core with a length dimension and made of material that is bendable along the length dimension to selectively form various bent shapes, and that retains the bent shapes without external support. The elongated body also has at least one layer of second material provided around the core, the second material being elastomeric or resiliently flexible. An outer surface of the body has a plurality of markings, including a first line marking positioned at a 0-degree point, a second line marking positioned at a 90-degree point, a third line marking positioned at a 180-degree point and a fourth line marking positioned at a 270-degree point.

8 Claims, 18 Drawing Sheets

(56) References Cited

U.S. PATENT DOCUMENTS

| | | | |
|---|---|---|---|
| 5,182,954 A | 2/1993 | Menheere | |
| 5,228,478 A | 7/1993 | Kleisle | |
| D345,197 S | 3/1994 | Potter | |
| D445,170 S | 7/2001 | Speicher | |
| D454,179 S | 3/2002 | Speicher | |
| D454,386 S | 3/2002 | Speicher | |
| 6,604,552 B2 * | 8/2003 | Hansen | F16L 9/147 138/143 |
| 7,077,166 B2 * | 7/2006 | Heo | F16L 11/122 138/121 |
| 8,037,840 B2 | 10/2011 | Sutter | |
| 9,200,194 B2 | 12/2015 | Tomlin et al. | |
| 9,588,074 B2 | 3/2017 | Demanze | |
| 10,323,776 B2 * | 6/2019 | Dawson | F16L 9/00 |
| 2011/0017340 A1 * | 1/2011 | Mirossay | C04B 38/02 521/178 |
| 2011/0041943 A1 | 2/2011 | Donnelly | |
| 2014/0231103 A1 | 8/2014 | Savage et al. | |
| 2017/0197457 A1 | 7/2017 | Garr et al. | |

OTHER PUBLICATIONS

International Search Report and Written Opinion dated Sep. 10, 2018, from application No. PCT/US2018/041140.
Non-Final Office Action dated Jul. 6, 2018, from U.S. Appl. No. 15/648,356.
Notice of Allowance dated Feb. 8, 2019, from U.S. Appl. No. 15/648,356.
Republic Conduit, Electrunite Electrical Metallic Tubing (EMT), http://republicconduit.com/en/Products/ElectruniteElectrical.aspx.

* cited by examiner

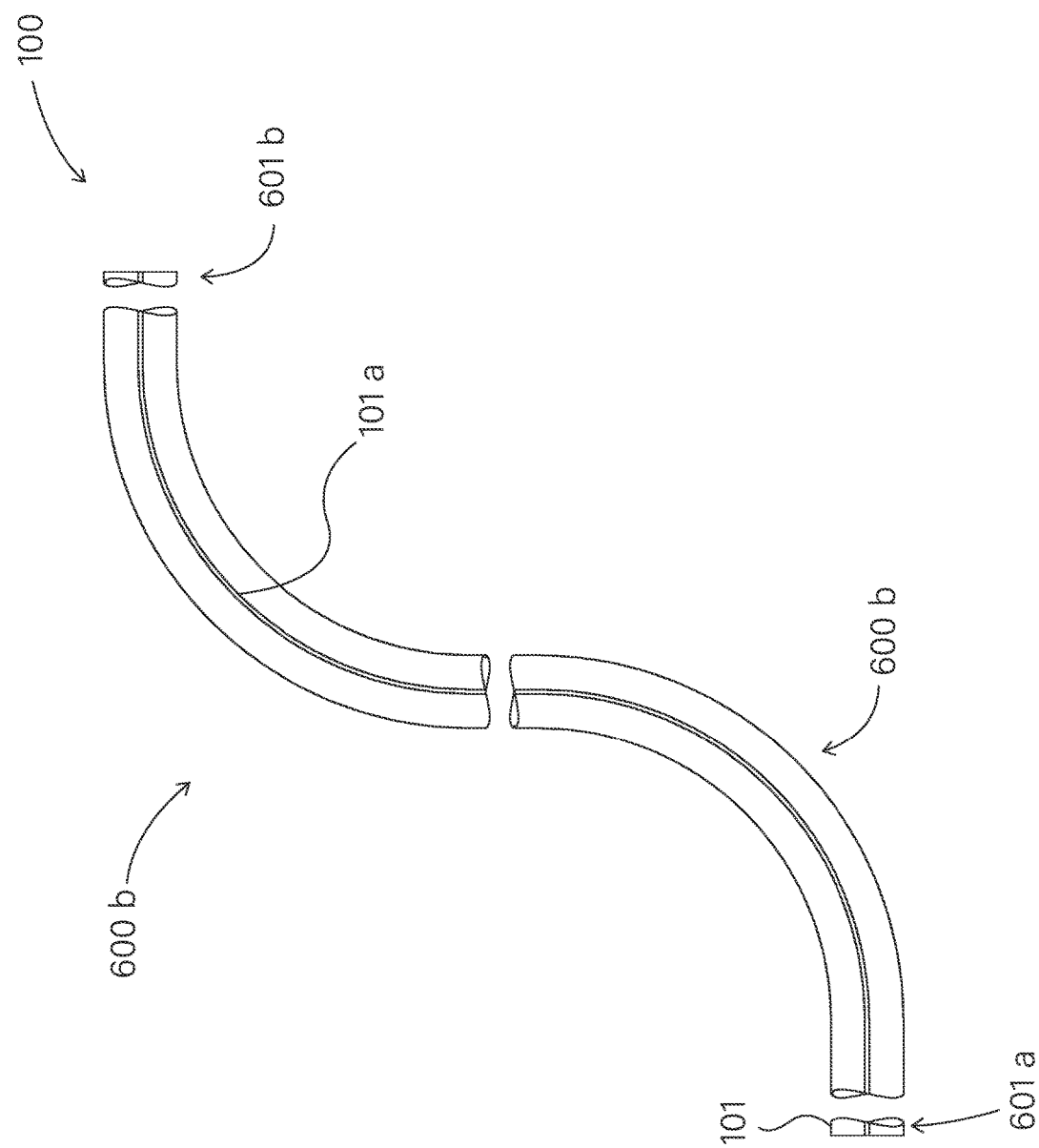

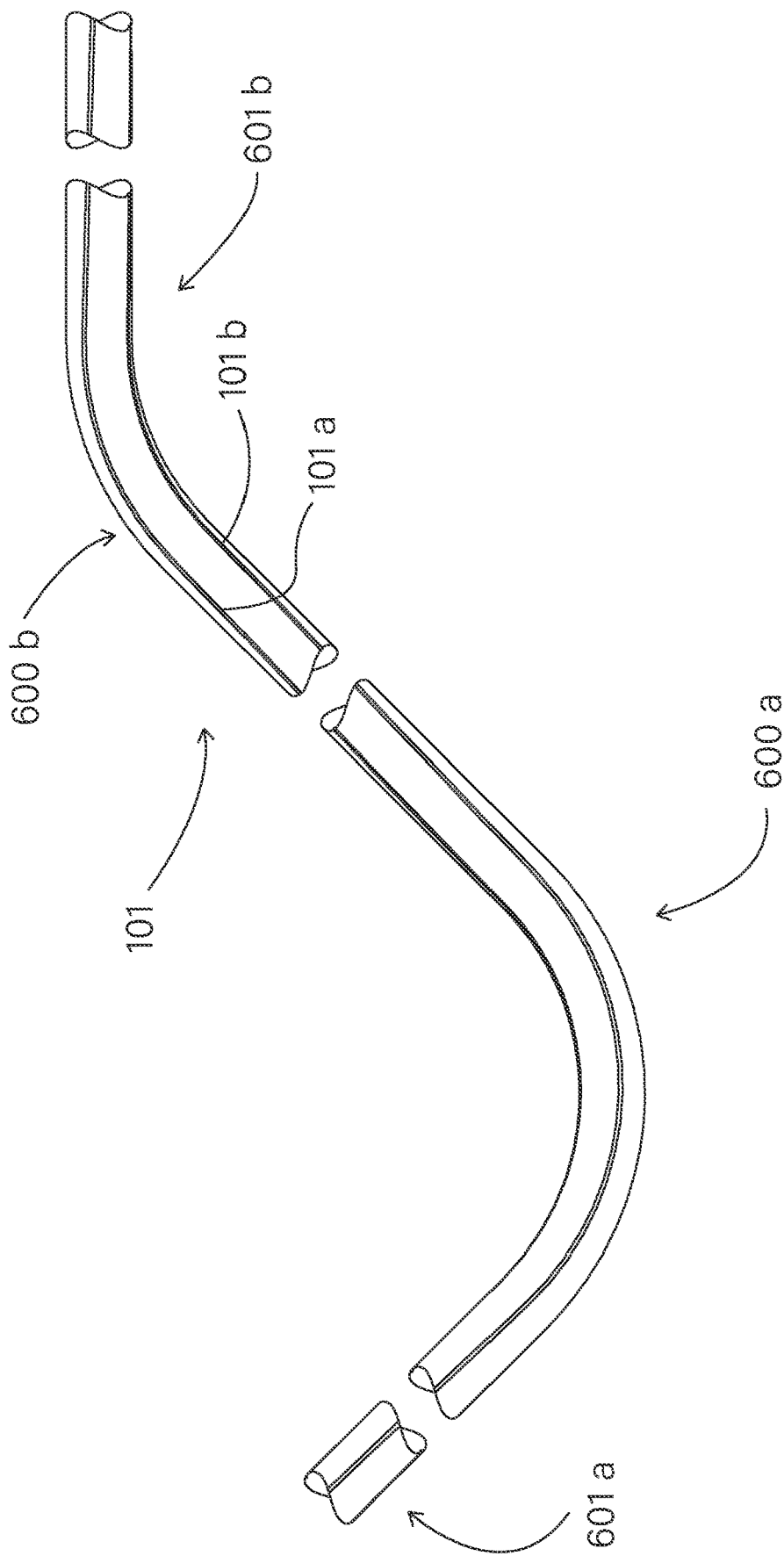

MARKED GUIDE FOR CONDUIT OR TUBE BENDING

BACKGROUND

1. Field

The disclosure relates generally to marked guides for bending conduits or tubes and, in particular embodiments, to a bendable guide tool with a plurality of markings extending along an axial length dimension of the tool and spaced at various intervals around the axial dimension of the tool, to guide proper alignment of bends in conduits or tubes.

2. Background

Conduits or tubes, such as pipes or other tubular members, are commonly used to contain wires or cables, fiber optics, and fluids. Typically, they are bent to fit the shape of an environment, such as within a ceiling, wall or other structure or object. Bent tubes are also commonly used as structural elements in objects such as bicycle frames or parasails, and are bent to create structural components of the object. Current techniques of bending a conduit or tube include using a hand bender or a hydraulic bender, where the user inserts the conduit or tube into a cylindrical opening and operates the bender to produce bends of various angles. Other techniques of bending a conduit or tube include bending by bracing and applying force to the conduit or tube with the knees or hands and judging the bends by eye. These techniques may frequently result in "dog-legging," which occurs when two or more bends on a length of a conduit or tube are misaligned and are not straight within a plane, making it difficult or impossible to fit the bent conduit or tubing to a desired space or environment for example, within a wall, ceiling or other structure or object. Misalignment often results in difficulties in installing the conduits or tubes, and can result in disposal and waste of misaligned, bent conduits or tubes.

To assist in maintaining proper alignment of two or more bends in a conduit or tube, a marked conduit or tube configuration is described in U.S. Pat. No. 10,323,776. A marking configuration on conduits or tubes as described in that patent can provide a visual indication of proper or improper bends. However, even with such marked conduit or tube configurations, there can be difficulties in visually judging and forming proper bends, for example, to fit a particular space in a wall, ceiling or other object or structure. In many contexts, conduits or tubes have been bent at work sites (e.g., by electricians or plumbers at a construction site or by technicians at a manufacturing or assembly site) to fit a particular space or structure. In some cases, a skilled person may visually observe or measure the space or structure to estimate the bending directions and bending amounts based on the visual observation or measurements. Such estimations can be prone to errors (especially for inexperienced users or trainees), which can result in disposal and waste of the misaligned conduit or tube.

SUMMARY

Embodiments of the present disclosure relate to marked guides for bending conduits or tubes and, in particular embodiments, to bendable guides with a plurality of markings along a length dimension at various intervals, to guide proper alignment of bends in conduits or tubes.

According to various embodiments, a marked guide for bending conduits or tubes includes an elongated body having a bendable core with a length dimension and made of a first material that is bendable along the length dimension to selectively form various bent shapes, where the core retains the bent shapes without external support. The elongated body further includes at least one layer of second material provided around the core and extending along at least a portion of the length dimension of the core, the second material being elastomeric or resiliently flexible. The elongated body has an outer surface extending along at least the portion of the length dimension of the core, and a plurality of markings that are viewable along the length dimension of the outer surface. The plurality of markings include a first line marking, wherein the first line marking is positioned at a 0-degree point of a cross-sectional view of the body; a second line marking, wherein the second line marking is positioned at a 90-degree point relative to the 0-degree point of the cross-sectional view of the body; a third line marking, wherein the third line marking is positioned at a 180-degree point relative to the 0-degree point of the cross-sectional view of the body; and a fourth line marking, wherein the fourth line marking is positioned at a 270-degree point relative to the 0-degree point of the cross-sectional view of the body.

In further examples, the core includes a bendable material that is capable of being bent and re-bent multiple times and in multiple directions without breaking, and retains and holds its shape when bent.

In further examples, the core include one or more strands of wire made of at least one of aluminum, copper, steel, brass, cast iron, or other suitable bendable metal or a bendable plastic, polyvinyl chloride (PVC), chlorinated polyvinyl chloride (CPVC), PEX (cross-linked polyethylene) or nylon.

In further examples, the at least one layer of second material comprises at least one layer of elastomer foam.

In further examples, the at least one layer of second material comprises a layer of flexible polyurethane foam.

In further examples, the at least one layer of second material comprises a layer of overmolded elastomeric material that is overmolded onto the core.

In further examples, the at least one layer of second material comprises a layer of flexible foam that is reaction-molded onto the core.

In further examples, the layer of flexible foam forms an outer skin layer defining the outer surface of the elongated body.

In further examples, the elongated body has a diameter of up to 12 inches and a length of up to about 120 inches.

In further examples, the plurality of markings extends along the entire outer surface of the elongated body, in the length dimension.

In further examples, the plurality of markings extends along a portion of, but not the entire length dimension.

In further examples, the plurality of markings comprises one or more additional line markings on the outer surface of the marked conduit or tube, wherein the additional line markings are parallel to the first, second, third, and fourth line markings.

In further examples, the first, second, third, and fourth line markings are identical in color and design, and wherein additional line markings are distinguishable from the first, second, third, and fourth line markings by color or design.

In further examples, the length dimension of the body is a length that allows the body to be bent two or more times along its length.

In further examples, the marked guide further includes a first end cap attached to a first end of the body and a second end cap attached to the second end of the body, where the first and second end caps are made of a material more rigid than the second material.

In further examples, each cap has an opening for receiving an end portion of the elongated body, and has an outer surface that is flush with the outer surface of the elongated body.

Further examples relate to a method of manufacturing a marked guide, where the method includes forming an elongated body including: providing a bendable core having a length dimension and made of a first material that is bendable along the length dimension to selectively form various bent shapes, and that retains the bent shapes without external support; and forming at least one layer of second material around the core and extending along at least a portion of the length dimension of the core, the second material being elastomeric or resiliently flexible. The elongated body has an outer surface extending along at least the portion of the length dimension of the core. The method further includes providing a plurality of markings that are viewable along the length dimension of the outer surface of the elongated body, including: a first line marking, wherein the first line marking is positioned at a 0-degree point of a cross-sectional view of the body; a second line marking, wherein the second line marking is positioned at a 90-degree point relative to the 0-degree point of the cross-sectional view of the body; a third line marking, wherein the third line marking is positioned at a 180-degree point relative to the 0-degree point of the cross-sectional view of the body; and a fourth line marking, wherein the fourth line marking is positioned at a 270-degree point relative to the 0-degree point of the cross-sectional view of the body.

In further examples of the method, forming the at least one layer of second material comprises molding at least one layer of elastomeric material onto the core.

In further examples of the method, forming at least one layer of second material comprises reaction molding at least one layer of flexible foam directly onto the core.

In further examples of the method, forming a skin on the flexible foam during or after the reaction molding, the skin being formed of the second material.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 6A-6C are side views of a marked guide with properly aligned bends;

FIGS. 6D-6F are side views of a marked guide with a "dog leg"; and

Figure 1:
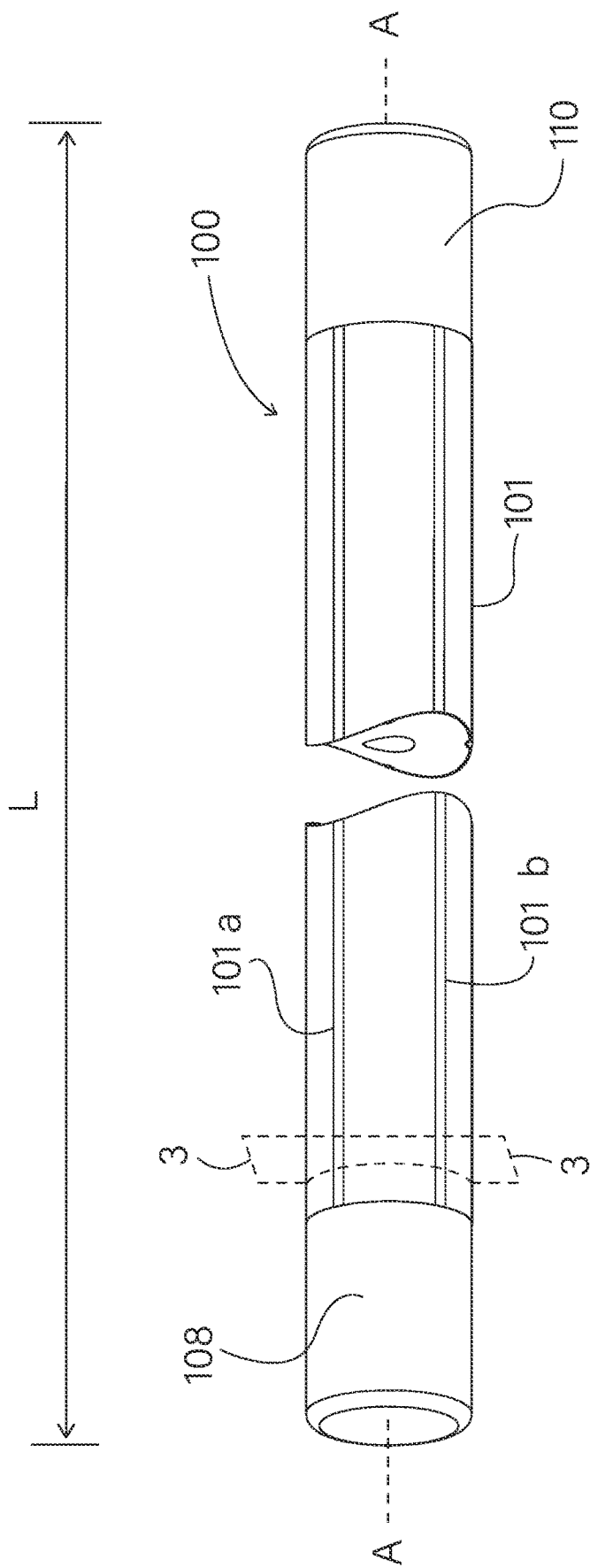
FIG. 1 is a perspective view of an example of a marked guide in an un-bent configuration.

The features of embodiments will become more apparent from the detailed description set forth below when taken in conjunction with the drawings, in which like reference characters identify corresponding elements throughout. In the drawings, like reference numbers generally indicate identical, functionally similar, or structurally similar elements.

DETAILED DESCRIPTION

Example embodiments of the invention relate to marked guides for bending conduits or tubes, or other elongated rod or shaft-like structures. The marked guides can provide a tool or aid in estimating bends, and may be used to reduce misaligned bends and minimize wasted conduit or tube material. In the present description, the terms "conduit," "tube," "tubular structure," and "pipe" may be used interchangeably. A bendable conduit or tube includes a hollow body made of a bendable material that holds its bent shape and an interior channel extending between two ends of the hollow body such as, but not limited to cast iron, brass, steel, galvanized steel electrical metallic tubing (EMT) rigid metal conduit, other bendable metal, plastic, polyvinyl chloride (PVC), chlorinated polyvinyl chloride (CPVC), cross-linked polyethylene (PEX), nylon or the like. In some examples, the hollow body may be marked on its outer surface with markings to assist in alignment of bends such as, but not limited to, conduits, tubes and markings described in U.S. Pat. No. 10,323,776 (which is incorporated herein by reference, in its entirety). In other examples, the hollow body is not marked with such markings.

In particular examples, the conduit or tube may be an electrical conduit for containing electrical wires or other electrical components. In other examples, the conduit or tube may be a plumbing conduit for providing a fluid or gas flow path. In yet other examples, the conduit or tube may be used for communication of other materials, sound, light or other the like. As described herein, such conduits or tubes are often bent into a particular, desired shape, for example, to fit into a particular space or structure, where the bending angles must be sufficiently precise to accommodate the space or structure. While examples of marked guides are described herein as a tool for guiding the bending of hollow conduits and tubes, various examples described herein may be employed in a similar manner as a tool or guide for bending elongated rod or shaft structures that are solid or partially solid (not hollow) in cross-section.

FIGS. 1-4 show an example of a marked guide 100 for guiding the bending of conduits or tubes (or other rod or shaft structures). The marked guide 100 has a bendable, elongated body 101 having a rod or shaft shape. The body of the marked guide 100 has a plurality of markings 101*a-d* along its length dimension at various intervals to guide proper alignment of bends in body of the marked guide. Once the body 101 is bent into a proposed shape, the bent, marked guide 100 can be aligned with a space in a wall, ceiling or other structure, to verify a proper fit in the space. If needed, additional bending of the body 101 of the marked guide may be carried out, to adjust the fit. Once the proper fit is verified, the marked guide 100 may be removed from the space and then used as a guide to bend a conduit or tube (or other rod or shaft) into that same bent shape. Thereafter, the marked guide 100 may be unbent or re-bent into another shape, for example, to assist with another conduit or tube bending operation.

Figure 2:
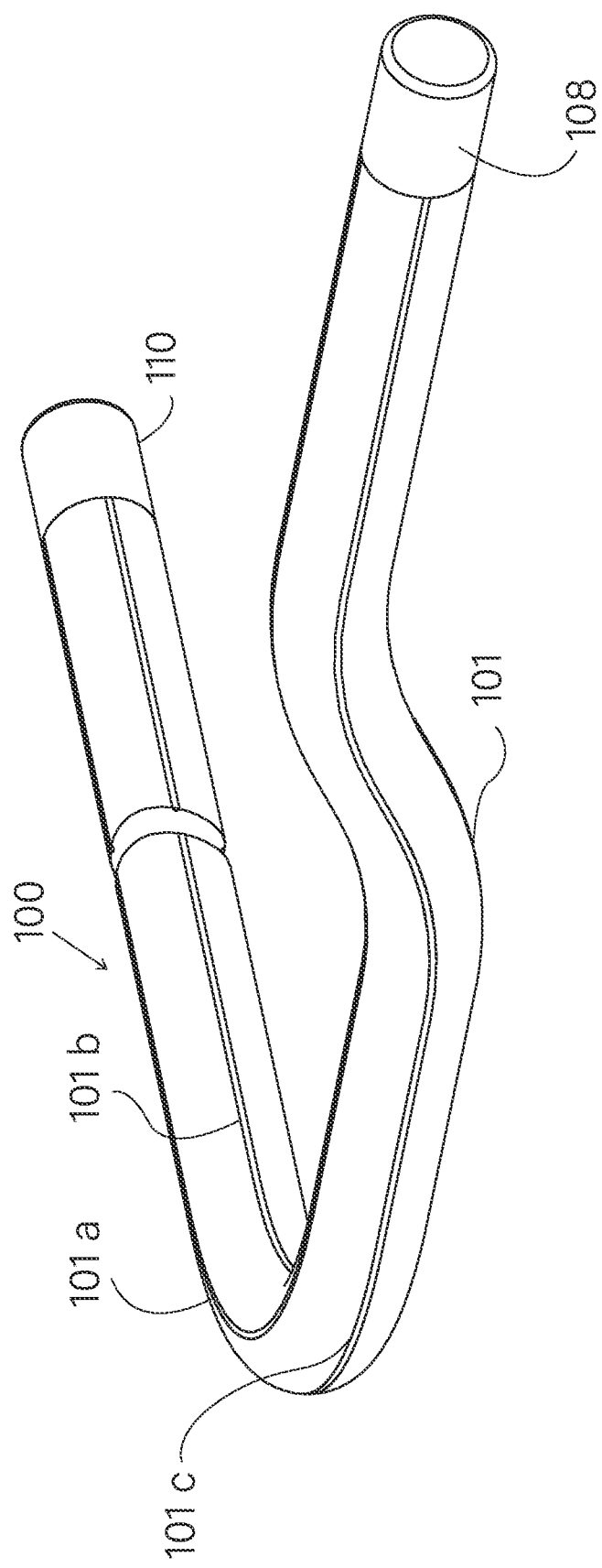
FIG. 2 is a perspective view of the marked guide of FIG. 1, but in an example of a bent configuration.
Figure 3:
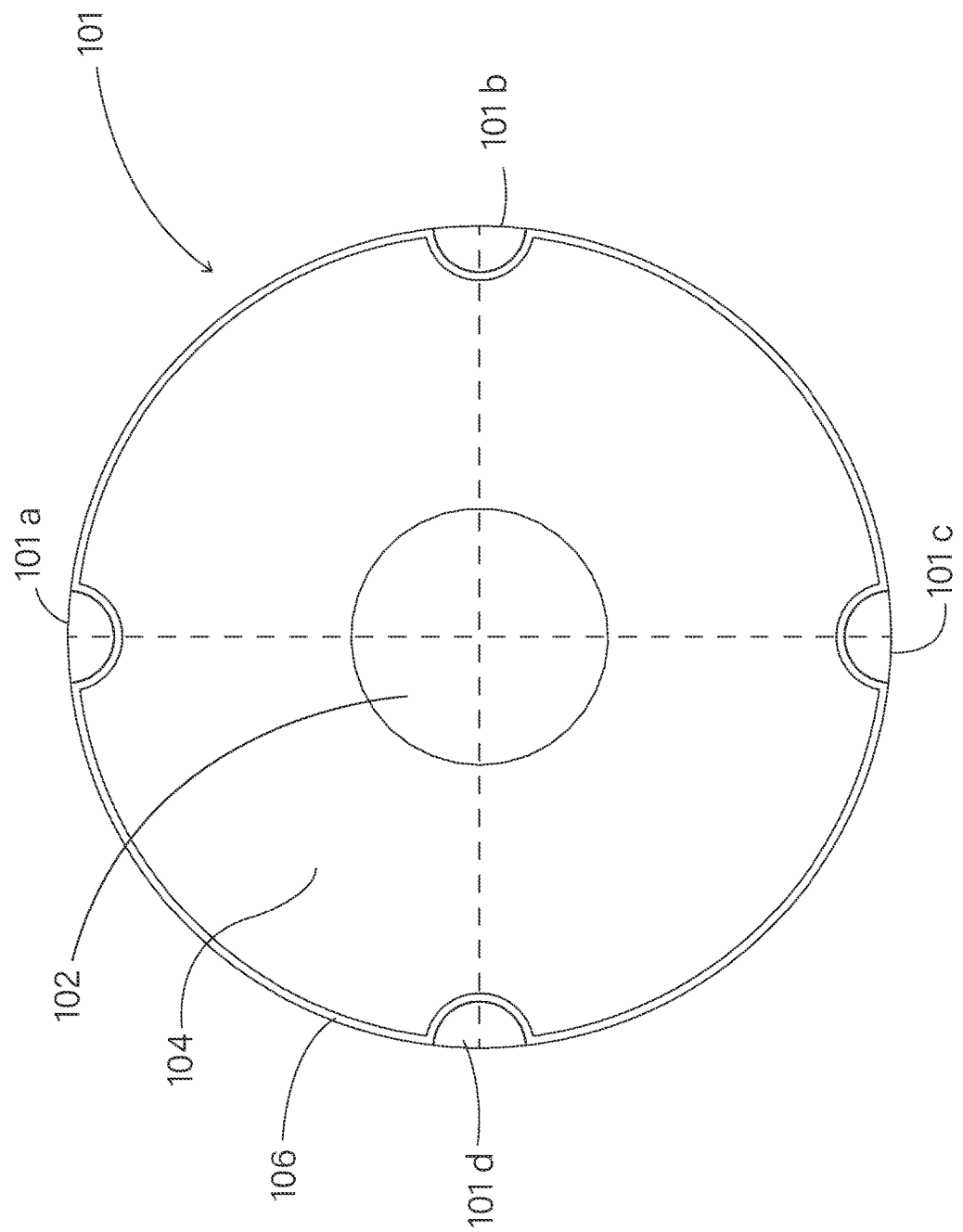
FIG. 3 is a cross-sectional view of the body of the marked guide of FIG. 1.

In FIG. 1, the elongated body 101 of the marked guide 100 is shown in a generally straight or un-bent configuration. In the straight or unbent configuration, the body 101 has an axis A along its length dimension. In FIG. 2, the same elongated body 101 of the marked guide 100 is shown in a bent configuration, for example, after the body 101 in FIG. 1 has been bent. A cross-section representation of the body 101 is shown in FIG. 3, as taken along the cross-section line 3-3 in FIG. 1. An exploded view of the marked guide 100 is shown in FIG. 4.

Figure 4:
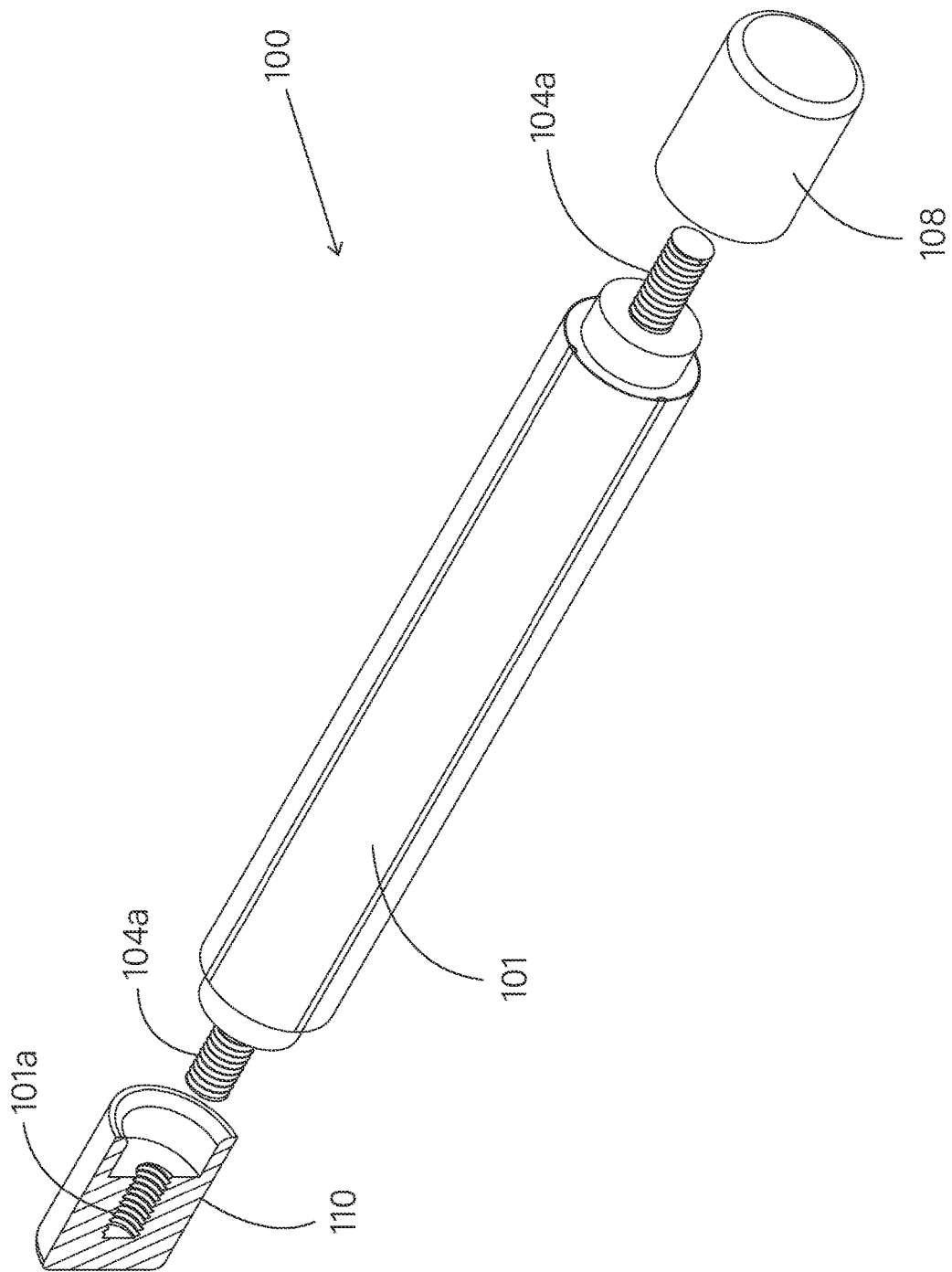
FIG. 4 is a perspective, partially exploded view of the marked guide of FIG. 1.

The elongated body 101 of the marked guide 100 may have any suitable end-to-end length L (as represented by the break in the length in FIGS. 1, 2 and 4). However, in particular examples, the length L is selected to be a length that allows the marked guide 100 to be easy to store, transport and use in its intended environment of use such as, but not limited to, a construction site, a workshop, a manufacturing or assembly facility, a classroom, or the like. Additionally, the length L should be suitably long enough to correspond to a length section of conduit or tubing that is expected to require bending for typical (or specific) applications of use such as, but not limited to, typical electrical or plumbing conduit installations. In certain examples, the length L may be a length in the range of about 24 inches to about 120 inches. In particular examples, the length L is in the range of about 48 inches to about 60 inches.

In the example of FIGS. 1-4, the body 101 of the marked guide 100 includes a core 102, an inner layer 104 and an outer layer or skin layer 106. In other examples, the body 101 of the marked guide 100 may include two or more inner layers 104, two or more outer or skin layers 106, or combinations thereof. The marked guide 100 in FIGS. 1-4 also includes a first end cap 108 and a second end cap 110, at the two opposite ends of the body 101.

The core 102 extends along the length L dimension of the body 101, and is made of a material and configuration that is bendable along its length, but sufficiently rigid to retain and hold its bent shape after being bent. In particular examples, the material and configuration of the core 102 allows the core (and the body 101) to be bent and re-bent by a pipe-bending tool (such as, but not limited to a hand bender or a hydraulic bender), or by hand for example, with an amount of force that a typical human adult may apply with low or moderate exertion. In addition, the material and configuration of the core 102 allows the core to be bent in multiple different directions at any location (or at multiple different locations) along the length of the body 101. In some examples, the core 102 may be a rod, shaft, wire, or cable of single or multiple strands of a bendable metal or other bendable material that retains and holds its shape when bent. In particular examples, the core 102 is made of a material and configuration that allows the core 102 (and the body 101) to be bent, straightened and re-bent multiple times (such as, but not limited to multiple hundreds of times or more) over an operational life of the marked guide 100, without breaking the core 102.

In some examples, the core 102 includes a single strand wire or a multi-strand wire, where each strand extends the entire length dimension of the core 102 (and of the body 101) and is made of aluminum, copper, steel, brass, or other suitable bendable metal or a bendable plastic, polyvinyl chloride (PVC), chlorinated polyvinyl chloride (CPVC), PEX (cross-linked polyethylene), nylon, and/or the like. In particular examples, the core 102 has a single strand of solid aluminum extending along the length L dimension.

In other examples, a multi-strand wire may provide additional strength characteristics as compared to a single-strand wire, while allowing flexibility to bend in multiple directions. In yet other examples, a core 102 may be configured of multiple segments connected along the length L dimension, at bendable joints, where each joint allows two joined segments to be positioned at an angle (e.g., any angle or preset angles of or between 0 and 180 degrees) relative to each other, to form a bend in the length of the core 102 and the body 101.

The diameter of the core 102 may be any suitable size, and may be selected based on the material and configuration (e.g., number of strands) of the core 102, for example, to provide sufficient strength, durability, bendability and operational life of the marked guide 100. In certain examples, the core 102 may have a diameter in the range of about 0.125 inch to about 0.75 inch. Other examples may have cores having other suitable dimensions.

The inner layer 104 surrounds the core 102, and extends along the length L dimension of the body 101. The inner layer 104 is made of a material and configuration that is resiliently pliable or malleable, for example, in response to the squeezing force of a typical adult human's hand, and return to its original, un-squeezed shape, when the squeezing force is removed. In particular examples, the resilient pliability of the inner layer 104 allows the marked guide 100 to be easily gripped and held without slipping, and provides a squeezable, but firm tactile feel, when the marked guide 100 is held in a user's hand.

In certain examples, the inner layer 104 is made of an elastomer material. In particular examples, the inner layer 104 is made of a flexible polyurethane foam, or other suitable elastomer foam material. The weight ratio (pounds per cubic foot) of the elastomer foam material is selected for proper tactile feel and durability. In certain examples, an elastomer foam having a weight ratio of between about 10-18 lbs/ft$^3$ (or of 15 lbs/ft$^3$) may be selected. In particular examples, the material of the inner layer 104 may include a flexible, closed-cell foam material such as, but not limited to FlexFoam-IT™ 15 from Smooth-On, Inc. While certain examples include a polyurethane foam, other examples may include a silicone or silicone foam material for the inner layer 104. In other examples, other suitable foam or non-foam elastomer materials may be employed for the inner layer 104 (for example, to provide a desired resilient pliability and rigidity).

The diameter of the inner layer 104 may be any suitable size, and may be selected such that the overall diameter of the marked guide 100 corresponds to the diameter of a standard or typical conduit or tube (for example, a typical electrical conduit or a typical plumbing conduit). In certain examples, the inner layer may have a diameter of any suitable size, for example, up to 12 inches such as, but not limited to a diameter of ½ inch, ¾ inch, 1 inch, 1¼ inches, 1½ inches, 2 inches, 2½ inches, 3 inches, or 4 inches. In other embodiments, the diameter of the inner layer 104 may be any size up to 24 inches.

The inner layer 104 may be provided on the core 102 by any suitable process, including, but not limited to molding, over-molding, extruding, coating, heat staking, casting, or the like. In certain examples, a flexible foam material (as described herein) is over-molded over the core 102 by a reaction injection molding process. In particular examples of a reaction injection molding process for forming the inner layer 104, the core 102 is placed in a mold and a mixture of fluidized polyurethane is injected into the mold with the core 102. Then, the contents of the mold are subjected to suitable conditions (e.g., one or more of mold temperature, pressure, relative humidity, reaction time, or other conditions) to cause the fluidized polyurethane to react within the mold and create a foam around the core.

A reaction injection molding process can provide an economical manner of forming the elastomer inner layer 104 of a desired shape, size and elasticity, and securing that inner layer to the core 102. In other examples, other suitable injection molding, roto-molding or other molding processes may be used to apply the inner layer 104 onto the core 102. In yet other examples, other suitable processes including, but not limited to extrusion, coating, 3-D printing, heat staking, casting, or the like, may be employed to apply the inner layer 104 onto the core 102.

In the example of FIGS. 1-4, the inner layer 104 defines a generally cylindrical outer peripheral shape having a circular cross-section, and the outer layer 106 or skin takes a matching shape. That shape corresponds to the cylindrical shape of typical electrical conduits, plumbing conduits and other conduits and tubes that commonly require bending. In other examples, the outer shape of the inner layer 104 (and of the outer layer 106 or skin) may have other suitable shapes including, but not limited to cylindrical with oval or polygonal cross sections, or combinations thereof.

The outer layer 106 surrounds the inner layer 104, and extends along the length L dimension of the body 101. In particular examples, the outer layer 106 is a relatively thin layer of the same material as the inner layer 104, but has additional durability to resist abrasions and tears relative to the inner layer 104. For example, the outer layer 106 may be a self-forming skin of the inner layer 104. In such examples, the material of the inner layer 104 may be a self-skinning foam material that creates an outer layer or skin that is non-porous (or less porous than the rest of the inner layer 104). A self-skinning foam material such as, but not limited to the FlexFoam-IT™ 15 material from Smooth-On, Inc. discussed above, may be used. In other examples, other suitable self-skinning foam materials may be used to form the outer layer 106 or skin.

In particular examples, the self-skinning foam forms the durable outer layer 106 or skin during the same molding process in which the inner layer 104 is formed (e.g., before the molded body 101 is removed from the mold). Accordingly, upon removing the body 101 from the mold, the inner layer 104 has been formed on the core 102, and the outer layer 106 or skin has been formed on the inner layer 104, as shown in FIG. 3. By employing a single molding process to form the resiliently elastic inner layer 104 and the durable outer layer 106 or skin, improvements and efficiencies in the manufacturing of the marked guide 100 may be achieved.

In other examples, the outer layer 106 or skin may be formed by other suitable processes, or may be made of a different material than the inner layer 104 (or both). Other suitable processes of forming an outer layer 106 or skin include, but are not limited to extrusion processes in which the outer layer 106 is extruded over the inner layer 104, co-extrusion processes in which the outer layer 106 and the inner layer 104 are co-extruded together over the core 102, or other molding processes, coating processes, 3D-printing processes, shrink wrap, shrink tube, other wrap processes, weaves, or combinations thereof. Other suitable materials for the outer layer 106 include, but are not limited to, silicone, plastic, vinyl, or other polymer, polyurethane or plastic material, weaves of metal, natural or synthetic fiber fabrics, animal skins or other materials or combinations thereof. In certain examples, two or more outer layers 106 made of or by any of those materials and processes (or combinations thereof in the same or different layers) may be provided on the outside of the inner layer 104. In yet other examples, the outer layer or skin 106 may be omitted.

In certain examples, the first end cap 108 and the second end cap 110 have identical configurations, which can help make the manufacturing and assembly of the marked guide 100 more efficient. In other examples, the first end cap 108 may be different from the second end cap 110 in certain aspects. For example, one of the end caps 108 and 110 may have markings, a magnet, hook or loop feature for hanging, or other features, while the other end cap may be devoid of those features or have one or more other features. In particular examples, the end caps 108 and 110 provide smooth and aesthetical end surfaces of the marked guide 100. In other examples, the end caps 108 and 110 may be omitted.

In the example of FIGS. 1-4, each end cap 108 and 110 has a cup-shaped body having a partially hollow interior, an open end and a closed end. The cup-shaped body of the end caps may be made of a generally rigid material such as, but not limited to plastic, metal, ceramic, composite material, wood, or combinations thereof. The end caps 108 and 110 may be made by any suitable process including but not limited to molding, machining, 3D-printing, combinations thereof, or the like. Each end cap 108 and 110 is configured to be attached to a respective one of the ends of the body 101, by any suitable attachment mechanism including, but not limited to threading, friction or press fitting, glue or other adhesive, combinations thereof or the like.

In the example in FIGS. 1-4, the caps 108 and 110 are configured to fit onto the ends of the body 101, such that the outer surfaces of the caps 108 and 110 is flush with the outer surface of the body 101 (e.g., flush with the outer surface of the outer layer 106 or skin of the body 101). For example, at each end portion of the body 101, the inner layer 104 may have a stepped portion that forms a small diameter section 104a having a diameter that is smaller than the rest of the inner layer 104 and the outer layer 106 on the body 101. Each of the small diameter end sections 104a has a diameter and size to fit into the partially hollow interior of one of the end caps 108 and 110, through the open end of the cup shaped body of the cap, when the end cap is attached to the body 101. When attached to the body 101, the end caps 108 and 110 have outer surfaces that are about the same diameter and, thus, substantially flush with the outer surface of the body 101.

In certain examples, the partially hollow interior of each end cap 108 and 110 has a receptacle (e.g., 110a in the end cap 110 shown in FIG. 4) having an opening or channel for receiving an end portion 102a of the core 102. In those examples, an end portion 102a extends beyond the end of the inner layer 104 by a sufficient distance to be received in the receptacle of an end cap 108 or 110, when the end cap is attached to the body 101. In certain examples, the receptacle in each end cap 108 and 110 may provide a tight friction or press fit onto an end portion 102a of the core 102, to secure or help secure the end cap to the body 101. In other examples, the end portions 102a of the core may be threaded, and the receptacle in each end cap 108 and 110 may be threaded to be connected in a screw threading manner to core 102, to secure or help secure the end cap to the body 101. In those or other examples, a glue or other adhesive may be provided between the outer surface of the small diameter end sections 104a and the inner surface of the cap 108 or 110, to secure or help secure the end cap to the body 101. When the caps are attached and secured to the body 101, the marked guide 100 has an overall configuration as shown in FIG. 1.

In particular examples, the body 101 of the marked guide 100 has a plurality of markings (four markings in the example of FIGS. 1-4). Each marking includes elongated, visually identifiable indicia extending parallel to the central axis A and along the length dimension L of the body 101. The plurality of markings may include a first line marking 101a, a second line marking 101b, a third line marking 101c, and a fourth line marking 101d.

Referring to FIG. 1, the line markings (101a and 101b being in view) are shown or represented as dashes on the outer surface of the body 101. Each of the line markings defines a line that extends along the length dimension L of the body 101, parallel to the central axis A. The first line marking 101a, second line marking 101b, third line marking 101c, and fourth line marking 101d are on (or visible on) the outer surface of the body 101 (the outer surface of the outer layer 106) such that each line marking is located at 90-degree intervals along the outer circumference of the body 101 of the marked guide 100. For example, in a circular cross-section of the body 101 (as shown in FIG. 1) the marked guide 100 may be arranged such that, when the first line marking 101a is at a designated 0 degree position, the second line marking 101b will be at 90 degrees (relative to the 0 degree location), the third line marking 101c will be at 180 degrees (relative to the 0 degree location), and the fourth line marking 101d will be at 270 degrees (relative to the 0 degree location).

Four line markings 101a-d at 90-degree intervals can provide a visual reference guide, showing one or more axially straight lines at any orientation of the cylindrical body 101. However, other examples may include fewer line markings (e.g., three line markings at 120 degree intervals, or two line markings at 180 degree intervals, or a single line marking), or additional line markings parallel to the line markings 101a-d. Alternatively or in addition, the line markings may be provided at different intervals than those mentioned above.

The line markings can be used to guide bending to align two or more bends in the same plane or in appropriate planes, and avoid dog legging, as described with regard to the marked conduits or tubes in U.S. Pat. No. 10,323,776. The descriptions of the bending methods in that patent (as well as the remainder of that patent) are incorporated herein by reference, and can be applicable to bending the body 101 of the marking guide 100 described herein.

Figure 5:
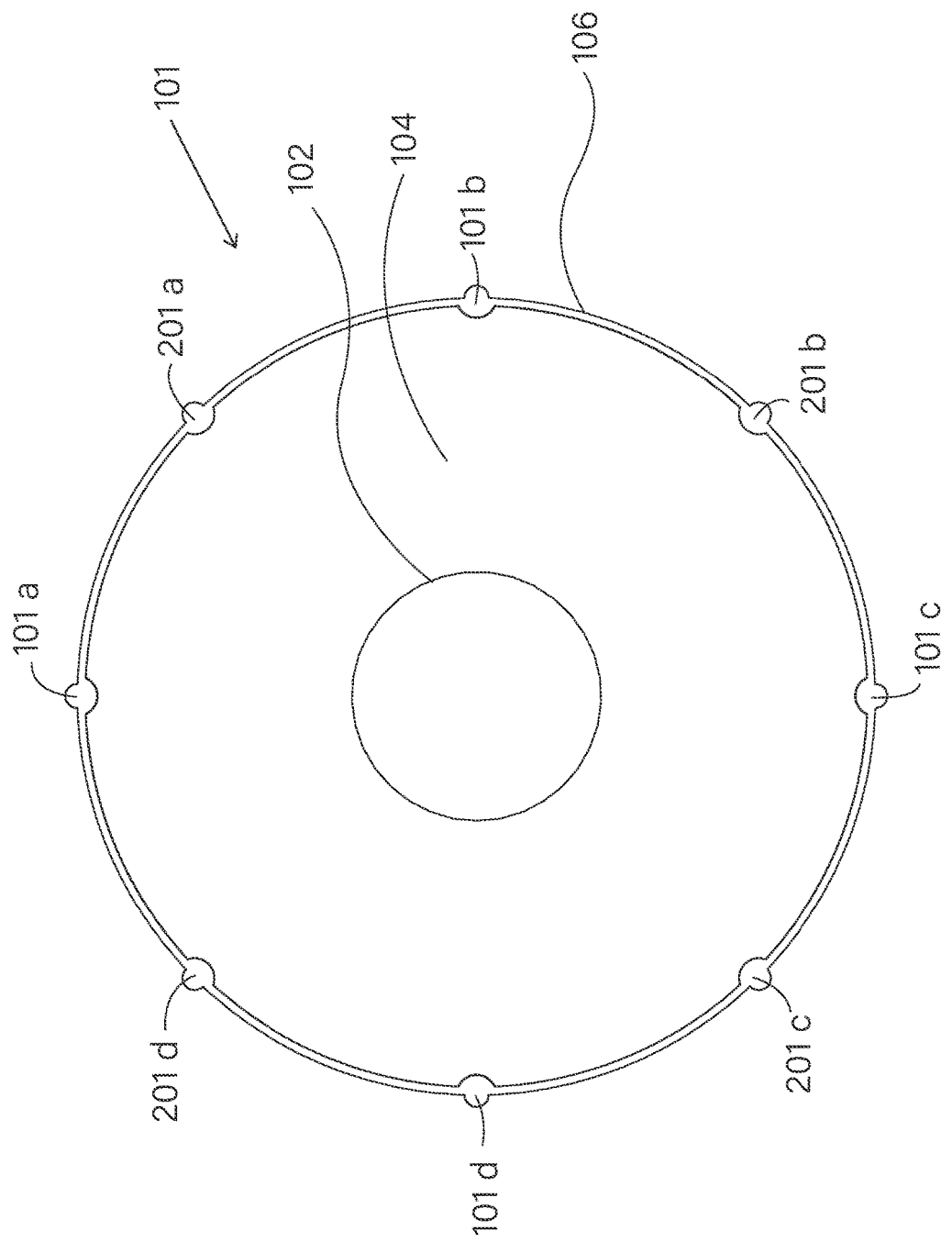
FIG. 5 is a cross-sectional view of the body of the marked guide of FIG. 1, showing additional line marking examples.

In some examples, as represented by FIG. 5, additional line markings 201a-201d may include line markings in groups of four, which are distinguishable from the first group of four line markings 101a-101d by color or design. For example, one embodiment may include a fifth line marking 201a, a sixth line marking 201b, a seventh line marking 201c, and an eighth line marking 201d, spaced at even intervals relative to each other and from the line markings 101a-101d. The additional line markings 201a-201d may be arranged at 90-degree intervals from each other. For example, when the body 101 is arranged such that the fifth line marking 201a is held at 30 degrees, the sixth line marking 201b will be at 120 degrees, the seventh line marking 201c will be at 210 degrees, and the eight line marking 201d will be at 300 degrees.

In other examples, the body 101 of the marked guide 100 may include any number of additional line markings. The additional line markings may be located at any suitable distance from adjacent markings, such as, but not limited to, 5-degree increments relative to the 0-degree point of the cross-sectional view of the body 101. In other embodiments, the distance between adjacent markings may be 1-degree, 2-degrees, 3-degrees, 10-degrees, etc. However, the presence of too many additional line markings may make it difficult to follow a single line marking along the length dimension L of the marked guide 100. Accordingly, in particular examples, groups of additional line markings (e.g., groups of four or another number of equally spaced line markings) may be distinguishable in any of the following ways: color, design, or pattern. In some embodiments, additional line markings may include line markings in groups of two or three, with each group being distinguishable from the first group of line markings 101a-101d by having a different color or design (or both). Some examples of distinguishable line markings are described below.

Figure 6B:
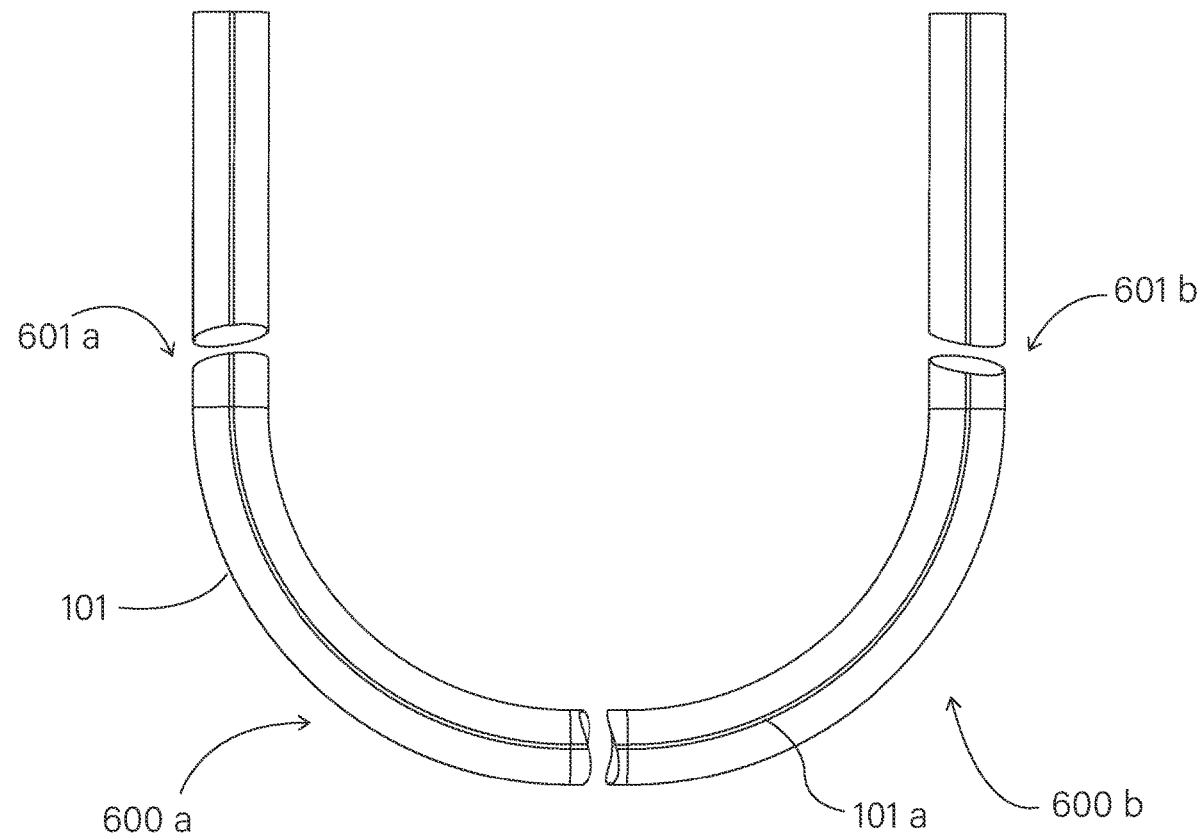
Figure 6C:
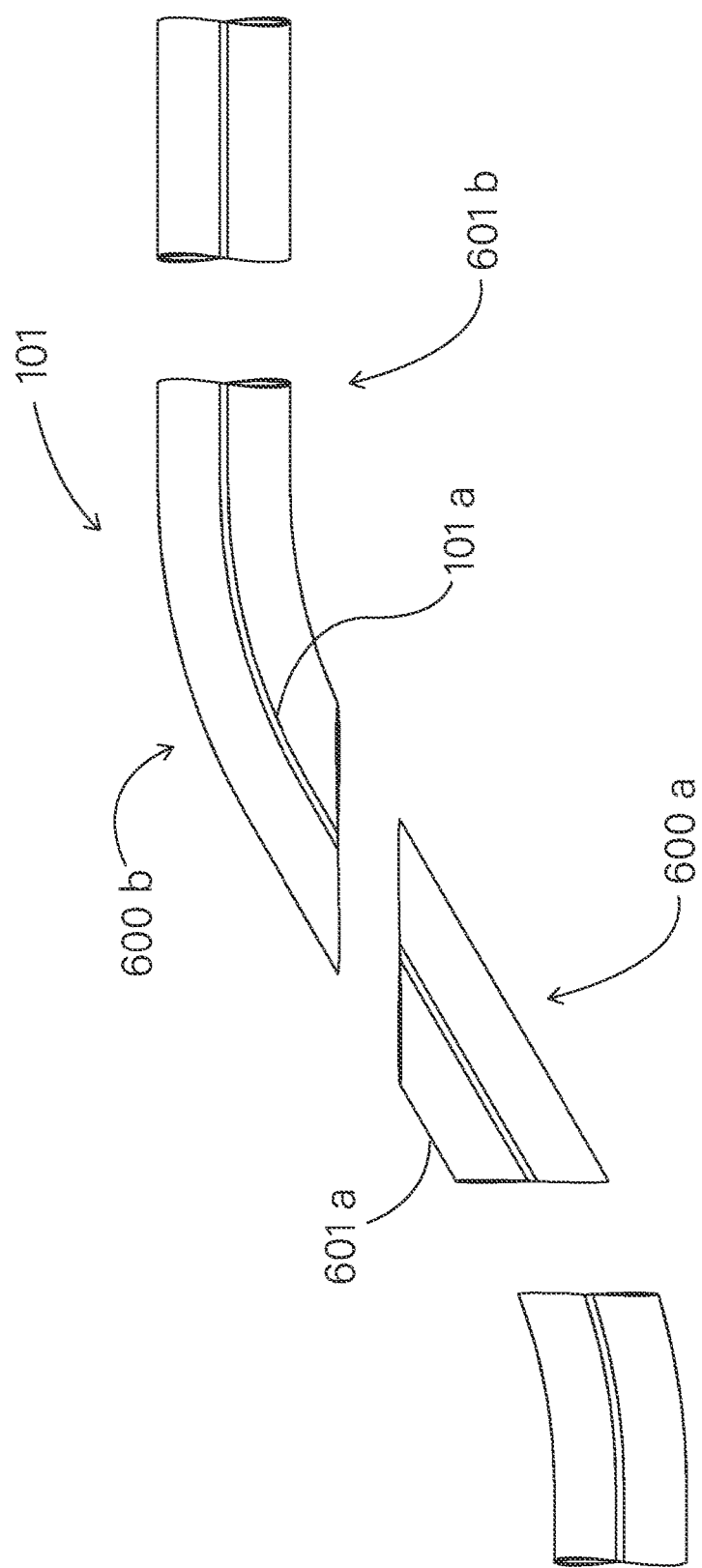
Figure 6E:
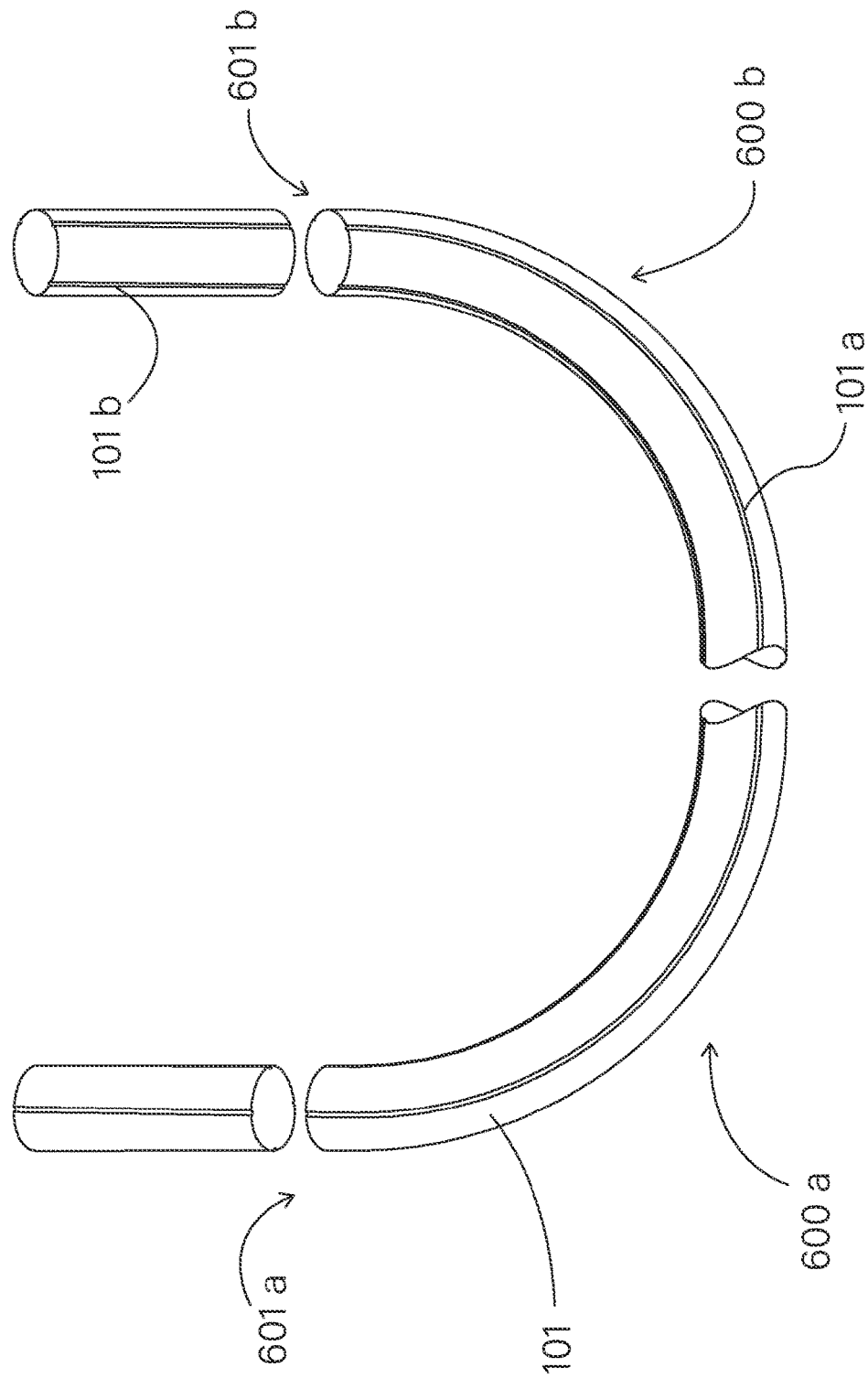
Figure 6F:
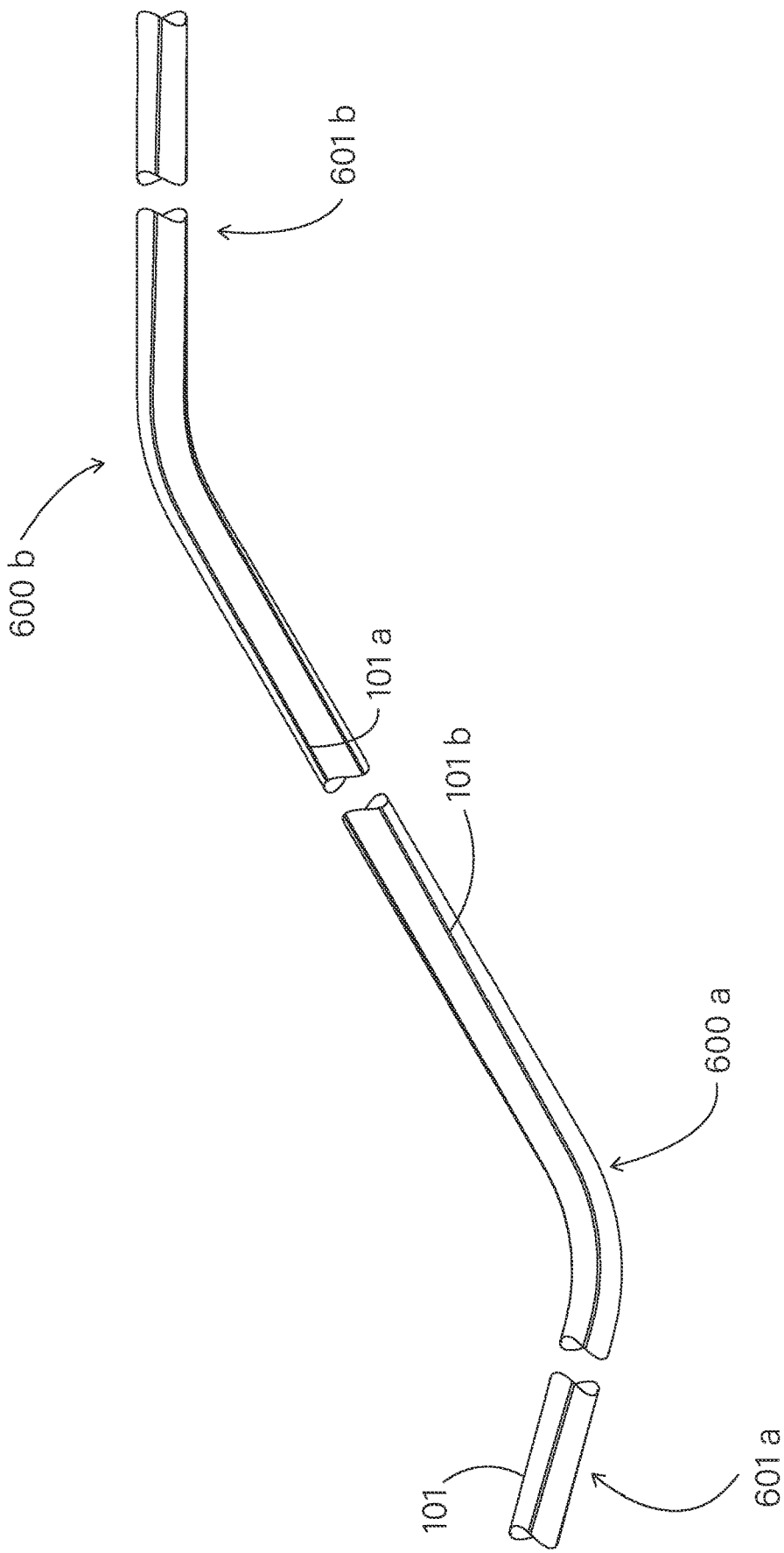
Figure 7A:
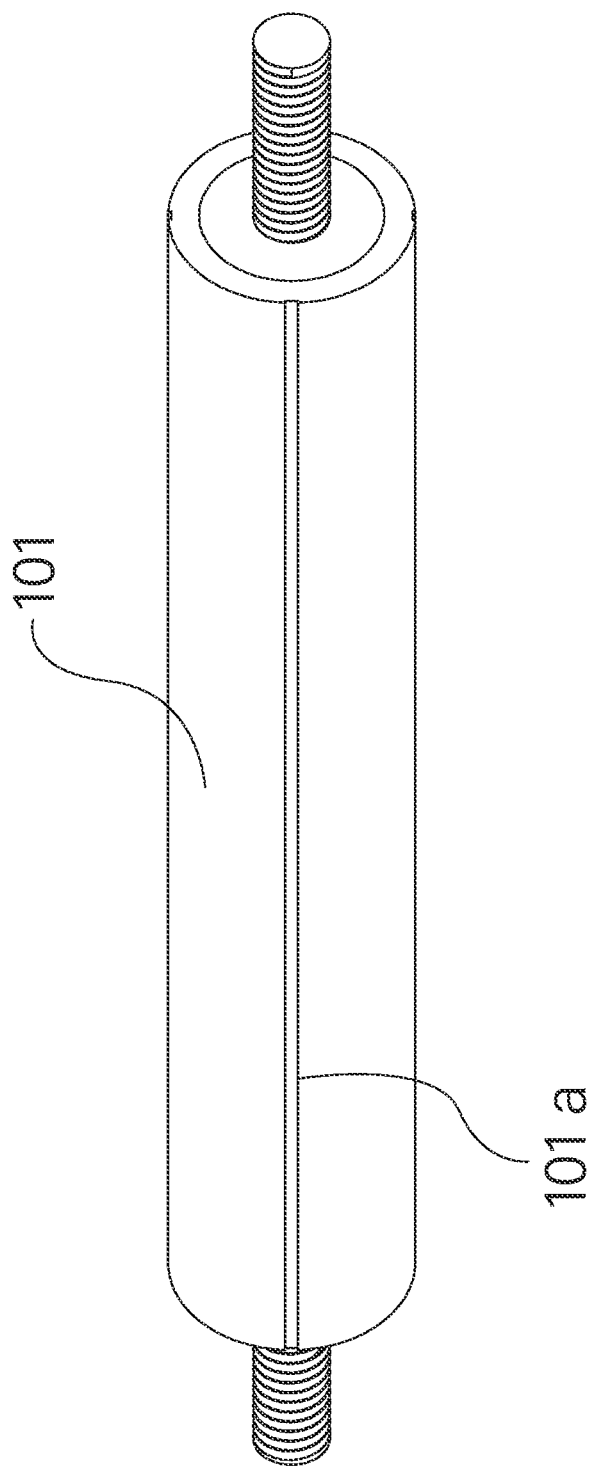
FIGS. 7A-7F are side views of a portion of the body of a marked guide, showing various examples of line markings.
Figure 7B:
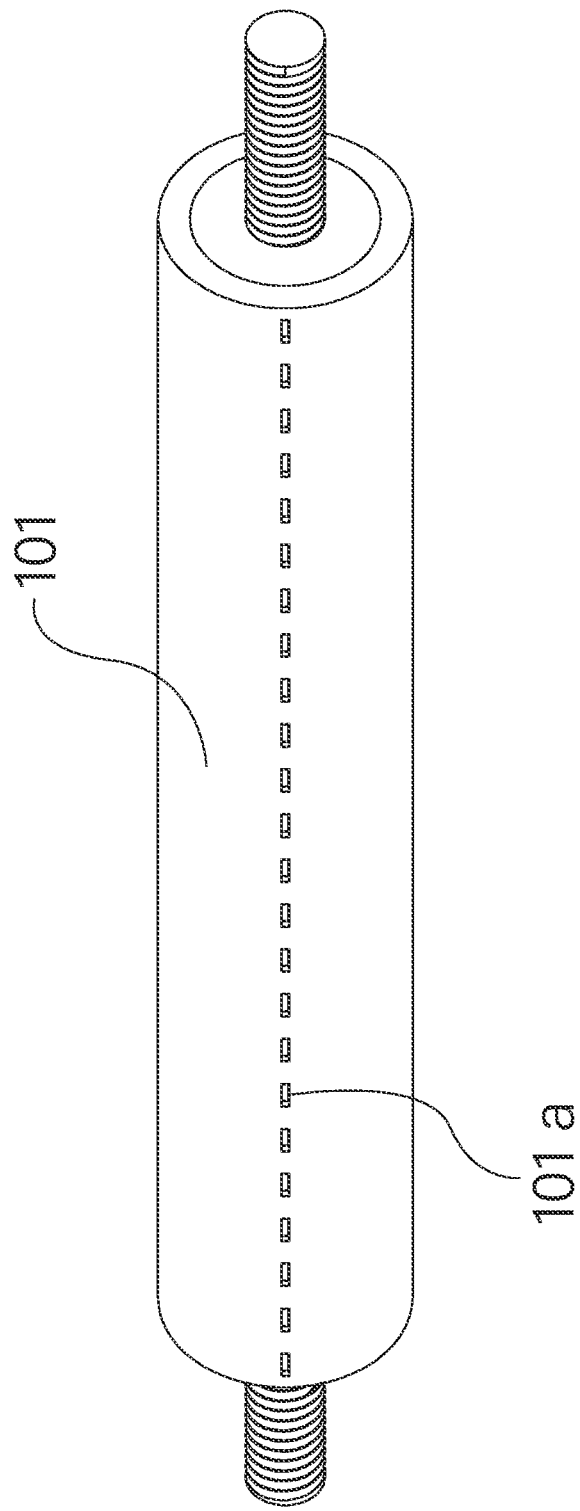
Figure 7C:
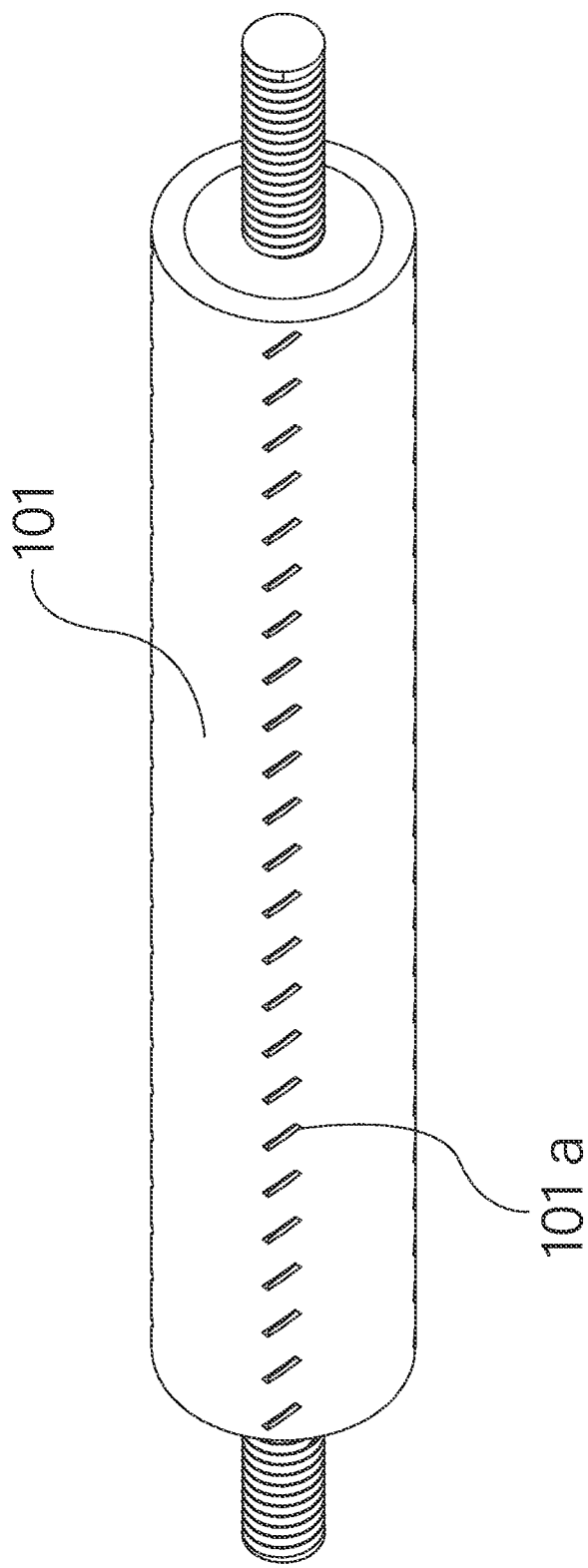
Figure 7D:
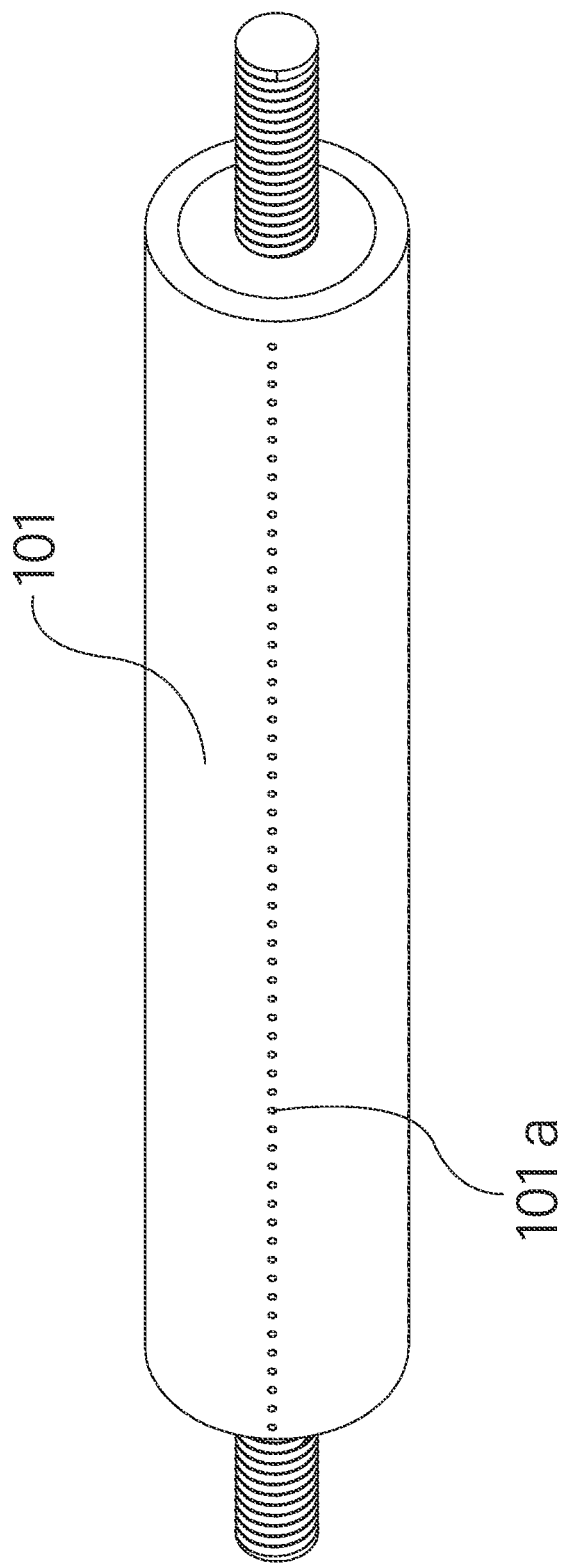
Figure 7E:
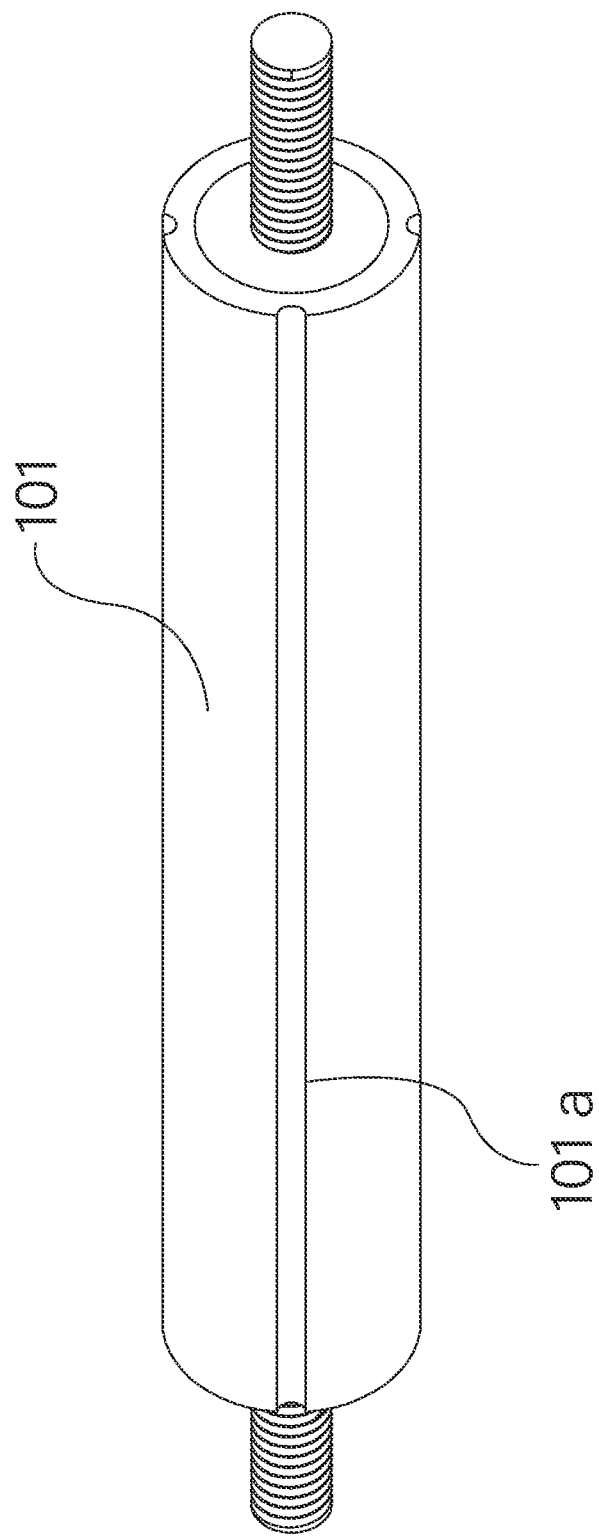
Figure 7F:
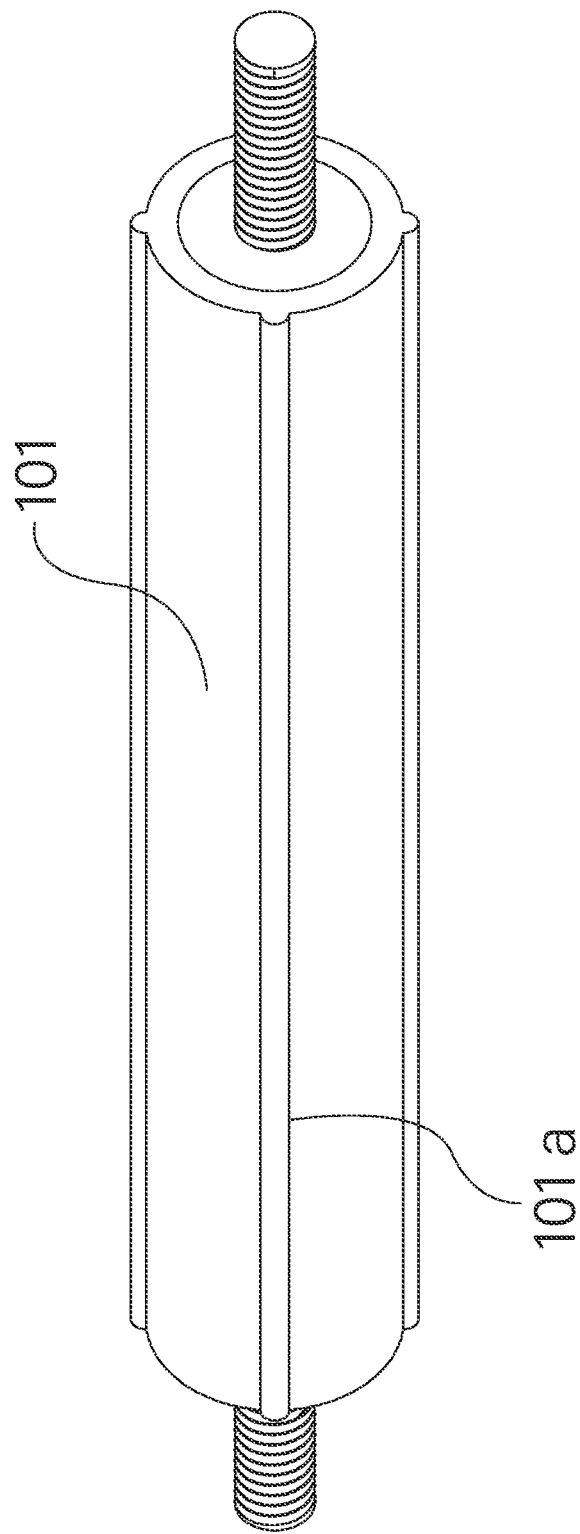

FIGS. 6A-6F show the body 101 of the marked guide 100, as being bent in various bend configurations having two bend angles in the same plane. FIGS. 6A-6C show the marked guide 100 with a properly aligned first bend 600a and second bend 600b. FIGS. 6D-6F show the marked guide 100 with an improperly aligned first bend 600a and second bend 600b, resulting in a "dog leg."

Referring to FIGS. 6A-6C, in some embodiments, the marked guide 100 may have a straight portion 601a of the body 101 before the first bend 600a and a second bend 600b with a straight portion 601b of the body 101 after the second bend 600b. The first line marking 101a may extend along the entire length dimension L of the marked guide 100 or may only extend along a portion of the length dimension L.

When the marked guide 100 in FIGS. 6A-6C has a properly aligned first bend 600a and second bend 600b in the same plane, the first line marking 101a will be visible and centered on the outer surface of the marked guide 100 along the entire length L dimension of the body 101. In some examples, the marked guide 100 may have properly aligned bends that are not in the same plane. For example, the marked guide 100 may be bent such that the straight portion before the first bend 600a and the straight portion after the second bend 600b are extending into planes that are perpendicular to each other. When the marked guide 100 has a first bend 600a and a second bend 600b such that the straight portion 601a before the first bend 600a and the straight portion 601b after the second bend 600b are extending into perpendicular planes, the user may use the line markings as visual guides to create 90-degree bends. The user may also rotate the marked guide 100 to view the bends from different perspectives and may use the line markings as visual guides from different perspectives to ensure that the bends are at 90-degree angles (or other desired angles).

Referring to FIGS. 6D-6F, when the marked guide 100 has an improperly aligned first bend 600a and second bend 600b, the first line marking 101a will not remain centered along the length of the body 101 of the marked guide 100. In addition, a portion of the second line marking 101b may become visible. In other words, when the marked guide 100 has a "dog leg," the first line marking 101a will not remain centered through the first bend 600a and the second bend 600b.

In other examples, the marked guide 100 may have improperly aligned bends that are not in the same plane. For example, the marked guide 100 may be bent such that the straight portion before the first bend 600a and the straight portion after the second bend 600b are extending into planes that are perpendicular to each other. In those examples, the user may use the line markings as visual guides to create 90-degree bends that are properly aligned. When the 90-degree bends are improperly aligned, the line markings will not form 90-degree angles. The user may also rotate the marked guide 100 to view the bends from different perspectives and may use the line markings as visual guides from different perspectives to ensure that the bends are at 90-degree angles. While examples in FIGS. 6A-6F show two bends, in other examples, the marked guide 100 may have any number of bends greater than two.

Some examples of distinguishable line markings are described with reference to line markings 701a-701f in FIGS. 7A-7F. In some examples, the line markings may be printed, drawn, or painted along the length dimension L of the outer surface of the body 101. With reference to FIGS. 7A-7F, the design of each line markings may be a solid line, a dashed line, a diagonal dashed line, a dotted line, or any other design suitable for forming a line marking, such as but not limited to a double (or multiple) lines with any of those line designs. In other examples, the plurality of line markings may be a combination of different designs. In some examples, the line markings may be recessed along the length dimension L. In another embodiment, the plurality of line markings may form protruding ribs or ridges along the length dimension L.

In particular examples, the line markings are formed in a molding process such as, but not limited to, the same molding process in which one or both of the inner layer 104 and the outer layer 106 or skin is formed. In such examples, the mold in which the inner layer 104 or the outer layer 106 (or both) is formed is provided with protruding features along a length dimension to form an elongated groove or recess (or series of recesses) along the length L dimension of the body 101, to define the line markings. Elongated grooves or recesses can provide easily identifiable line markings that resist wear and cannot be rubbed off.

Alternatively or in addition, the mold in which the inner layer 104 is formed may also be provided with recessed features extending along a length dimension to form elongated, protruding ribs or a pattern of protrusions or ribs along the length L dimension of the body 101, to define the line markings. In other examples, the mold that forms the inner layer 104 may include other features that form visually discernable line markings along the length L dimension of the body 101, to define the line markings.

In further examples, the line markings may be formed by a further molding (or over-molding) in which additional foam or other material (such as, but not limited to a colored urethane material) is injected into a mold to apply lines or line patterns of the additional material on the outer surface of the inner layer 104. In such further examples, the additional foam or other material used to form the line or line patterns includes a dye or colorant (or is otherwise made) to have a color that is different from the color of the outer surface of the inner layer 104, to be easy to visually identify on the marked guide 100. In a particular example, the mold that forms the inner layer 104 may include features that form the elongated grooves or recesses (or series of recesses) along the length L dimension of the body 101 as described above and, thereafter, a further molding (or over-molding) is carried out to fill (or partially fill) the elongated grooves or recesses (or series of recesses) formed in the inner layer 104 with the additional foam or other material (such as, but not limited to the colored urethane material).

In particular embodiments, the plurality of line markings may extend along the entire length of the length L dimension of the body 101. In other embodiments, the plurality of line markings may extend only a portion of the length L dimension. In still further embodiments, the plurality of line markings may be located at repeating intervals along portions of the length L dimension of the body 101.

In various examples described herein, the inner layer 104 is applied or formed directly on the core 102 by, for example, but not limited to, injection molding, other molding, extrusion, or other suitable methods. In other examples, one or more (or a plurality of) spacers may be provided around the core 102 before applying the inner layer 104 onto the core. In those examples, the one or more spacers are located between the core 102 and the inner layer 104, after the inner layer is applied. In certain examples, the one or more spacers help to maintain the core 102 centered in a mold (or other tool) in which the inner layer 104 is applied or formed. Alternatively or in addition, the one or more spacers can allow more flexibility in the type of foam or other material that is molded or otherwise applied over the core 102 and spacers to form the inner layer 104.

Figure 8:
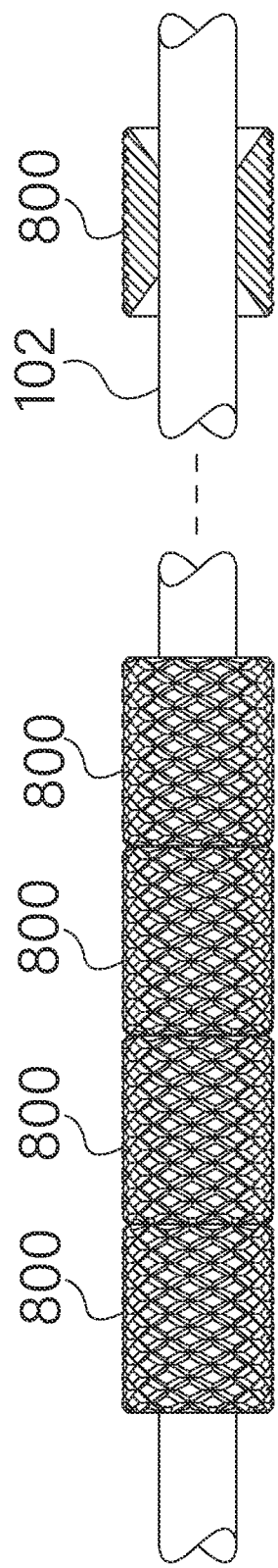
FIG. 8 is a side view of another example of a marked guide.

An example of spacers 800 on a core 102 is shown in FIG. 8. In certain examples, each of the one or more spacers 800 may include an annular or ring-shaped element through which the core 102 extends. In certain examples, each spacer 800 may have a tube-shaped body having a length dimension and an inner channel through which the core 102 extends coaxially with the spacer 800. In particular examples, the outer surface of each spacer 800 has a knurled or convoluted surface, to help the inner layer 104 to grip the spacers 800 and avoid slipping of spacers 800 relative to the inner layer 104. Alternatively or in addition, the shape of each spacer 800 may enhance gripping and retention of the core 102 within the spacer, while allowing the core 102 to bend in multiple directions between adjacent spacers. For example, some or each of the spacers may have an inner channel that flares outward (wider) at each end of the spacer 800, and reduces in diameter (narrows) at the center of the spacer 800. In such example, the narrow, center portion of the spacer 800 may have an inner diameter that is equal to (or slightly less than) the outer diameter of the core, such that the center portion of the spacer 800 engages and grips the core 102, while the flared end portions of the spacer 800 allow bending of the core in multiple directions.

In particular examples, a series of a plurality of spacers 800 may be arranged along the length dimension of the core 102. After the spacers are arranged along the length dimension of the core, the inner layer 104 may be formed over the spacers 800 (and the core 102), as described above. In other examples, the spacers 800 may be omitted, and the inner layer 104 may be formed or applied directly onto the core 102, as described in further examples herein.

A marked guide according to examples described herein may be used as a guide tool for bending conduits or tubes. The marked guides can provide a tool or aid in estimating bends to be made in a conduit or tube, before bending the conduit or tube. The marked guide may be used to reduce instances of misaligned bends and minimize wasted conduit or tube material.

For example, a marked guide 100 may be used in various environments, such as, but not limited to a work site, a factory or manufacturing facility, a trade shop classroom, or the like. For example, in the context of a work site (construction site, or the like), there may be a need to bend a conduit or tube to fit into a particular work space (such as, but not limited to a particular ceiling space, wall space or other structural space).

Accordingly, a marked guide 100 is selected as having a diameter correspond to or similar to the diameter of the conduit or tube to be bent. Then the body 101 of the marked guide 100 is bent (by a pipe bending tool or by hand) to correspond to estimate bends that would be formed in a length portion of the conduit or tube to allow the conduit or tube to fit into the work space. The line markings on the marked guide 100 are used to ensure that the bends in the marked guide 100 are properly aligned (and avoid dog legging).

Once the body 101 of the marked guide 100 is bent into a proposed shape, the bent, marked guide 100 can be aligned with the work space in a wall, ceiling or other structure, to verify a proper fit in the space. If needed, additional bending of the body 101 of the marked guide may be carried out, to adjust the fit (again, using the line markings on the marked guide to ensure proper alignment of the bends). Once the proper fit is verified, the marked guide 100 may be removed from the work space and then used as a guide to bend a conduit or tube into that same bent shape.

More specifically, with the marked guide 100 bent to the desired bend shape, a working piece of conduit or tube may be arranged adjacent the marked guide and bent (e.g., with a pipe bending tool or the like) to have corresponding bends (at locations along the length dimension and angles relative to the axis A of a straight marked guide 100) that match the bends of the marked guide 100. Once the conduit or tube is bent to the proper matching shape, the conduit or tube may be installed in the work space (or other sections of the same conduit or tube may be bent in a similar manner before installing the conduit or tube in the work space). Thereafter, the marked guide 100 may be unbent or re-bent into another shape, for example, to assist with another conduit or tube bending operation.

The marked guide 100 may be employed on work sites in which bending of conduits or tubes to fit work spaces at the work site is carried out. Similarly, the marked guide 100 may be employed in a work shop, factory or other manufacturing or assembly facility in which bending of conduits or tubes to fit into products is carried out. Alternatively or in addition, the marked guide 100 may be employed in class rooms, trade shops or the like, to help train electricians, plumbers, construction workers or other tradespersons that perform conduit or tube bending as part of a trade.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, and their equivalents, rather than the embodiments. Various modifications and changes that come within the meaning and range of equivalency of the claims are intended to be within the scope of the invention.

What is claimed is:

1. A marked guide comprising an elongated body including:
    a bendable core having a length dimension and made of a first material that is bendable along the length dimension to selectively form various bent shapes, and that retains the bent shapes without external support;
    at least one layer of second material provided around the core and extending along at least a portion of the length dimension of the core, the second material being elastomeric or resiliently flexible;
    wherein the elongated body has an outer surface extending along at least the portion of the length dimension of the core, and a plurality of markings that are viewable along the length dimension of the outer surface, the plurality of markings comprising:
        a first line marking, wherein the first line marking is positioned at a 0-degree point of a cross-sectional view of the body;
        a second line marking, wherein the second line marking is positioned at a 90-degree point relative to the 0-degree point of the cross-sectional view of the body;
        a third line marking, wherein the third line marking is positioned at a 180-degree point relative to the 0-degree point of the cross-sectional view of the body; and
        a fourth line marking, wherein the fourth line marking is positioned at a 270-degree point relative to the 0-degree point of the cross-sectional view of the body;
    wherein the at least one layer of second material comprises a layer of flexible polyurethane foam.

2. A marked guide comprising an elongated body including:
    a bendable core having a length dimension and made of a first material that is bendable along the length dimension to selectively form various bent shapes, and that retains the bent shapes without external support;
    at least one layer of second material provided around the core and extending along at least a portion of the length dimension of the core, the second material being elastomeric or resiliently flexible;
    wherein the elongated body has an outer surface extending along at least the portion of the length dimension of the core, and a plurality of markings that are viewable along the length dimension of the outer surface, the plurality of markings comprising:
        a first line marking, wherein the first line marking is positioned at a 0-degree point of a cross-sectional view of the body;
        a second line marking, wherein the second line marking is positioned at a 90-degree point relative to the 0-degree point of the cross-sectional view of the body;
        a third line marking, wherein the third line marking is positioned at a 180-degree point relative to the 0-degree point of the cross-sectional view of the body; and
        a fourth line marking, wherein the fourth line marking is positioned at a 270-degree point relative to the 0-degree point of the cross-sectional view of the body;
    wherein the at least one layer of second material comprises a layer of flexible foam that is reaction-molded onto the core.

3. The marked guide of claim 2, wherein the layer of flexible foam forms an outer skin layer defining the outer surface of the elongated body.

4. A marked guide comprising an elongated body including:
    a bendable core having a length dimension and made of a first material that is bendable along the length dimension to selectively form various bent shapes, and that retains the bent shapes without external support;
    at least one layer of second material provided around the core and extending along at least a portion of the length dimension of the core, the second material being elastomeric or resiliently flexible; and
    a first end cap attached to a first end of the elongated body and a second end cap attached the second end of the elongated body, the first and second end caps being made of a material more rigid than the second material;

wherein the elongated body has an outer surface extending along at least the portion of the length dimension of the core, and a plurality of markings that are viewable along the length dimension of the outer surface, the plurality of markings comprising:
   a first line marking, wherein the first line marking is positioned at a 0-degree point of a cross-sectional view of the body;
   a second line marking, wherein the second line marking is positioned at a 90-degree point relative to the 0-degree point of the cross-sectional view of the body;
   a third line marking, wherein the third line marking is positioned at a 180-degree point relative to the 0-degree point of the cross-sectional view of the body; and
   a fourth line marking, wherein the fourth line marking is positioned at a 270-degree point relative to the 0-degree point of the cross-sectional view of the body.

5. The marked guide of claim 4, wherein each cap has an opening for receiving an end portion of the elongated body, and has an outer surface that is flush with the outer surface of the elongated body.

6. A method manufacturing a marked guide comprising:
  forming an elongated body including:
   providing a bendable core having a length dimension and made of a first material that is bendable along the length dimension to selectively form various bent shapes, and that retains the bent shapes without external support; and
   forming at least one layer of second material around the core and extending along at least a portion of the length dimension of the core, the second material being elastomeric or resiliently flexible;
  wherein the elongated body has an outer surface extending along at least the portion of the length dimension of the core; and
  providing a plurality of markings that are viewable along the length dimension of the outer surface of the elongated body, including:
   a first line marking, wherein the first line marking is positioned at a 0-degree point of a cross-sectional view of the body;
   a second line marking, wherein the second line marking is positioned at a 90-degree point relative to the 0-degree point of the cross-sectional view of the body;
   a third line marking, wherein the third line marking is positioned at a 180-degree point relative to the 0-degree point of the cross-sectional view of the body; and
   a fourth line marking, wherein the fourth line marking is positioned at a 270-degree point relative to the 0-degree point of the cross-sectional view of the body;
  wherein forming the at least one layer of second material comprises reaction molding at least one layer of flexible foam directly onto the core or forming a layer of flexible polyurethane foam.

7. The method of claim 6, wherein forming the at least one layer of second material comprises molding at least one layer of elastomeric material onto the core.

8. The method of claim 6, further comprising forming a skin on the flexible foam during or after the reaction molding, the skin being formed of the second material.

* * * * *